United States Patent [19]

Schebesta et al.

[11] Patent Number: 5,669,710
[45] Date of Patent: Sep. 23, 1997

[54] COMPLETELY SELF-CLEANING MIXER/REACTOR

[75] Inventors: Klaus Schebesta; Heinrich Schuchardt; Martin Ullrich, all of Leverkusen, Germany

[73] Assignee: Bayer Aktiengesellschaft, Leverkusen, Germany

[21] Appl. No.: 564,531

[22] Filed: Nov. 29, 1995

[30] Foreign Application Priority Data

Dec. 5, 1994 [DE] Germany .................. 44 43 151.1
Jun. 19, 1995 [DE] Germany .................. 195 22 087.0

[51] Int. Cl.$^6$ .................. B29B 7/48; B29B 7/82
[52] U.S. Cl. .................. 366/97; 366/147; 366/300; 366/301; 366/313
[58] Field of Search .................. 366/83–85, 96–99, 366/144, 147, 297–301, 309, 312, 313; 425/204, 208, 209; 99/348

[56] References Cited

U.S. PATENT DOCUMENTS

| | | | |
|---|---|---|---|
| 3,687,422 | 8/1972 | List | 366/299 X |
| 3,689,035 | 9/1972 | List | 366/85 X |
| 4,556,324 | 12/1985 | Tynan | 366/301 X |
| 4,650,338 | 3/1987 | List et al. | 366/97 X |
| 4,857,632 | 8/1989 | Ahlberg et al. | 366/97 X |
| 4,941,130 | 7/1990 | List et al. | 366/99 |
| 4,950,081 | 8/1990 | List | 366/299 X |
| 5,230,562 | 7/1993 | Nishimi et al. | 366/298 |
| 5,334,358 | 8/1994 | Schuchardt et al. | 366/297 X |
| 5,399,012 | 3/1995 | Schuchardt et al. | 366/97 |
| 5,407,266 | 4/1995 | Dotsch et al. | 366/147 X |
| 5,505,536 | 4/1996 | Schuchardt | 366/97 |

FOREIGN PATENT DOCUMENTS

| | | |
|---|---|---|
| 0460466 | 12/1991 | European Pat. Off. . |
| 0528210 | 2/1993 | European Pat. Off. . |
| 0638354 | 2/1995 | European Pat. Off. . |
| 60-5226 | 1/1985 | Japan .................. 366/301 |
| 88/04198 | 6/1988 | WIPO .................. 366/147 |

*Primary Examiner*—Charles E. Cooley
*Attorney, Agent, or Firm*—Sprung Horn Kramer & Woods

[57] ABSTRACT

A multi-axis mixer/reactor with a large available useful capacity, which is kinematically self-cleaning, comprising at least one housing one, two or more parallel, contrarotating shafts 2, 2', on which intermeshing groups of gear wheels 3, 3' are disposed in an axially spaced-apart manner. The gear wheels 3, 3' are connected to one another by kneading bars 5, 5', while further kneading bars 4, 4' which are connected in each case only to one gear wheel are likewise disposed on the end faces of the gear wheels.

8 Claims, 15 Drawing Sheets

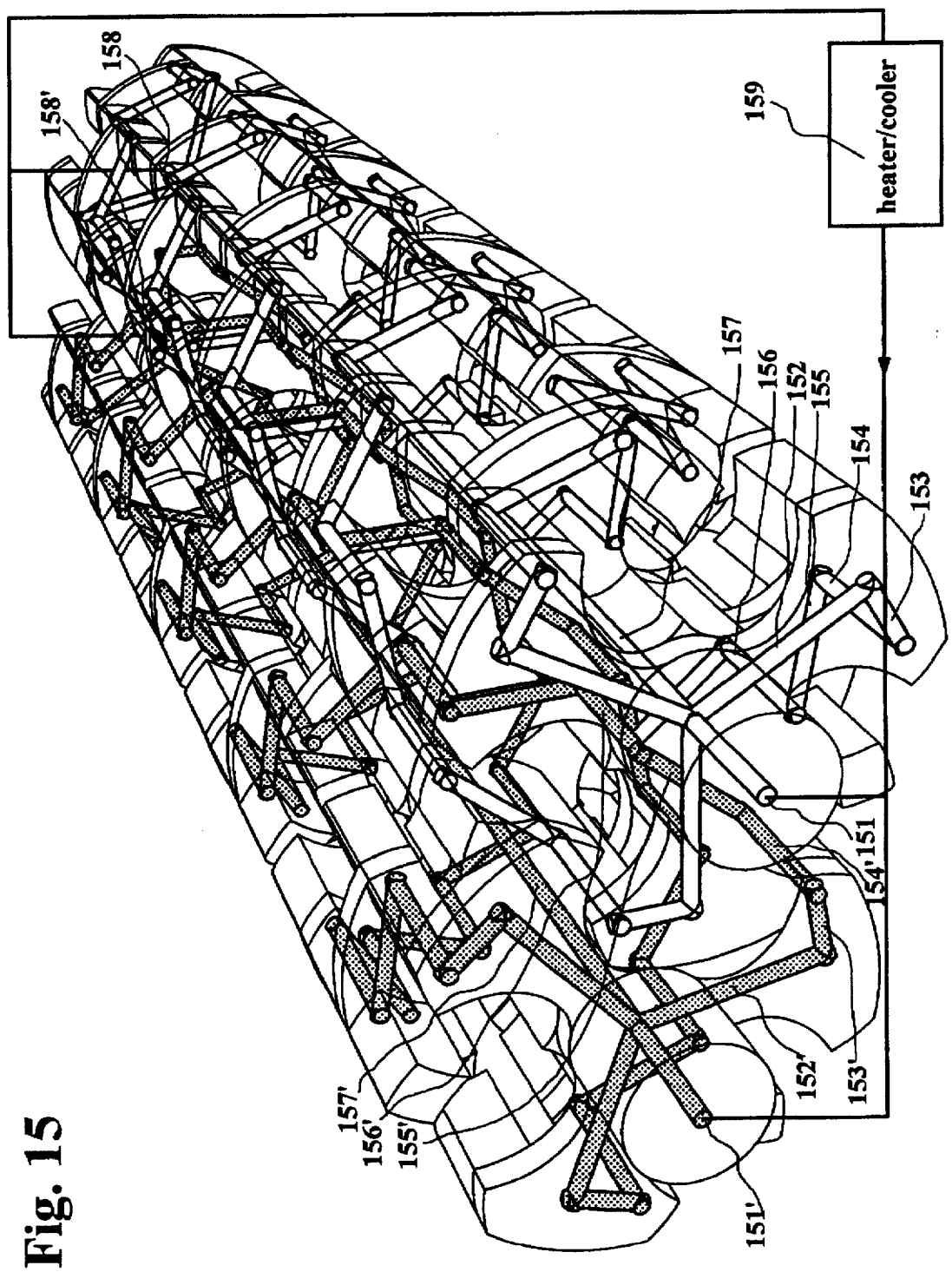

COMPLETELY SELF-CLEANING MIXER/REACTOR

The invention relates to a multi-axis mixer/reactor with a large available useful capacity, which is kinematically self-cleaning, comprising at least one housing and two or more parallel contrarotating shafts, on which axially spaced-apart, intermeshing groups of gear wheels are disposed. Said gear wheels are connected to one another by kneading bars. Further heading bars, which are connected in each case only to one gear wheel, are likewise disposed on the end faces of the gear wheels.

The invention is geared towards a mixer/reactor which, in process engineering, is capable of treating fluids and cohesive bulk materials. The mixer/reactor is completely self-cleaning kinematically and has a large available useful capacity.

In process engineering, when producing and processing plastic materials, it is necessary to treat highly viscous fluids. In particular, apparatuses are required for mixing, evaporation and reaction purposes. Said apparatuses have to enable a good mixing action and, in the case of evaporation, also enable rapid renewal of the free surfaces.

Product deposits on the walls of such mixers may lead to impairment of the process. Undesired side reactions are encouraged in the deposits on account of the substantially prolonged retention time of the material to be mixed in the reactor. This leads to contamination of the product. Product deposits on the walls may be avoided by kinematic self-cleaning of the mixer.

An example which may be cited is the manufacture of thermotropic, liquid-crystalline polyesters. What determines the speed in the final stage of polycondensationis the mass transfer of the condensation product into the reduced-pressure gas phase of the reactor. Said mass transfer requires a mass transfer surface which is as large as possible and the fastest possible renewal of said surface. Because of the marked structural viscosity, the condensation product has a tendency to deposit on the wall in non-mixed regions. The longer retention time leads in the medium term to black crack products which, if they pass into the product flow, lead to unsaleable goods.

To minimize the manufacturing and operating costs of a reactor/mixer, the available useful capacity should in addition be as large as possible, i.e. the agitating elements should take up a minimal mount of the housing capacity.

Said requirements are already met by the apparatus described in the German patent application (file reference P 4 326 807.2). Said apparatus does however have several serious shortcomings.

The axial permeability, i.e. the permeability along the rotor axis, for gases is comparatively low in said apparatus. The conveying paddles disposed spirally on the shafts separate the product area, as it were, into chambers which are connected to one another only by very narrow gaps.

Another mixer, which however only partially meets the above requirements, is described in the specification DE 41 26 425 A1. A major drawback of said mixer is its behaviour when stressed by highly viscous material to be mixed. In said mixer, only the shaft of the rotors may be used to absorb bending forces arising, for example, when mixing paste-like fluids. However, the shaft should on the other hand be as thin as possible in order to obtain a large available useful capacity. As a result, given the (on account of the self-cleaning) equally desired low clearances of the mixer structural parts relative to one another, because of the flexion of the shaft a ratio between the mixer length and the distance between axes of the rotors of more than 5, at best 7, is almost impossible to achieve. Especially in the case of continuous processes, this limits the attainable number of ideal stirring stages in such a reactor/mixer.

Both mixing devices moreover have the following drawbacks in common.

Between the kneading bars and the housing wall the product is compacted and squeezed at an acute angle. When the material to be mixed is extremely viscous or even contains solids, this leads rapidly to blocking of the shafts.

Product lying close to the housing wall is always urged outwards by the kneading bars. At evaporation stillheads or other comparable ports, there is eventually a discharge of material which ultimately closes the stillheads.

The object of the invention is to provide a mixer/reactor which is kinematically self-cleaning, has the largest possible available capacity and avoids the described drawbacks of the known mixers.

Said object is achieved according to the invention in that, in a multi-shaft mixer, intermeshing groups of gear wheels are mounted in an axially offset manner on each shaft. Said gear wheels are connected to one another by kneading bars. Further kneading bars, which are connected in each case only to one gear wheel, are likewise disposed on the end faces of the gear wheels.

By virtue of the fact that the gear wheels are spaced sufficiently apart from one another in an axial direction and overlap only part of the housing cross section, the axial permeability for the vapour is preserved.

Since the gear wheels are connected to one another by kneading bars, the gear wheel together with said bars and the shaft form a frame structure which is better able to absorb bending forces than the shaft alone.

The subject matter of the invention is a multi-axis mixer/reactor comprising a housing, two or more parallel, contrarotating shafts on which are disposed in an axially offset manner intermeshing groups of gear wheels which are connected to one another by kneading bars, and further kneading bars which are connected in each case only to one gear wheel and are likewise disposed on the end faces of the gear wheels, characterized in that each tooth of each gear wheel is connected by a kneading bar both to the gear wheel lying axially in front and to the gear wheel lying behind, that each tooth of each gear wheel, apart from at the end faces of the mixer/reactor, at each of the two end faces carries at least one further kneading bar, that the end faces of each gear wheel, apart from those which are cleaned by the housing end faces, are kinematically cleaned by the kneading bars of a respective other adjacent shaft, that the remaining surfaces of the gear wheels are completely kinematically cleaned either by the housing or by the meshed gear wheels of an adjacent shaft or by the adjacent shaft, that the end faces of the kneading bars, provided they are not connected to gear wheels, are cleaned by the gear wheels on a respective other adjacent shaft, that the remaining surfaces of the kneading bars of each shaft are completely kinematically cleaned either by the housing or by another adjacent shaft or by the kneading bars of another adjacent shaft, that the edges of cut of gear wheels or kneading bars arising in any radial section are geometrically all either arcs of a circle around the centre of rotation or epicycloidal sections, that the edges of cut of gear wheels or kneading bars arising in any radial section are geometrically all concave when they point inwards (i.e. when, in geometric terms, the normal vector on the edge of cut has a component in the direction of the axis of rotation) and that the edges of cut of the kneading bars arising in any radial section and all of the edges of cut of the surfaces of the gear wheels which clean the housing at the periphery are geometrically all concave when they point outwards (i.e. when, in geometric terms, the normal vector on the edge of cut has a component away from the axis of rotation), except for the edges of cut of surfaces which are cleaned by another shaft.

In said mixer, the end faces of all of the gear wheels are cleaned by the housing or by the kneading bars of an engaged rotor, the other gear wheel surfaces being cleaned by meshed gear wheels or by the shafts or by the housing. Complete kinematic cleaning of the end face of the kneading bars is effected by gear wheels, of the other surfaces of the kneading bars either by the housing or by the shaft or by the kneading bars of another rotor, and of the housing by kneading bars and gear wheels. The useful capacity of the mixer is preferably greater than 65%.

In the present context, kinematic cleaning or simply cleaning is understood as being the closest possible approach of the parts of the mixer during rotation of the rotors which is attainable during mixing while taking the manufacturing tolerance into account, so that said parts may slide past one another without blocking.

In the described manner it is possible as a whole to achieve self-cleaning, in particular complete self-cleaning of all of the surfaces of the mixer chamber.

By virtue of the fact that the gear wheels are spaced sufficiently apart from one another in an axial direction and overlap only part of the housing cross section, the axial permeability for the material to be mixed is preserved.

Since the gear wheels are connected to one another by kneading bars, the gear wheels together with the kneading bars and the shaft form a frame structure which is much better able to absorb bending forces than the shaft alone.

In accordance with the arrangement of the kneading bars which connect the gear wheels to one another at the periphery of the rotors, a maximum planar moment of inertia and hence minimal flexion of the shafts is achieved.

The geometry of the edges of cut, arising in a radial section, of the rotors of suitable mixer/reactors according to the invention may easily be described mathematically in the following way:
let 1 and 2 be two rotors having the angular velocities $\omega_1$ and $\omega_2$ and the centres $$\begin{pmatrix} o \\ o \end{pmatrix}$$

and $$\begin{pmatrix} a \\ o \end{pmatrix}$$

The movement of a point $$\begin{pmatrix} x_1 \\ y_1 \end{pmatrix}$$

of the rotor 1 in the coordinate system of the rotor 2 may be described as:

$$\begin{pmatrix} x_2 \\ y_2 \end{pmatrix} = \begin{pmatrix} \cos(\omega_2 * t)\sin(\omega_2 * t) \\ -\sin(\omega_2 * t)\cos(\omega_2 * t) \end{pmatrix} * \left( \begin{pmatrix} \cos(\omega_1 * t) & -\sin(\omega_1 * t) \\ \sin(\omega_1 * t) & \cos(\omega_1 * t) \end{pmatrix} * \begin{pmatrix} x_1 \\ y_1 \end{pmatrix} + \begin{pmatrix} a \\ o \end{pmatrix} \right)$$

In a preferred embodiment, the rotors rotate at the same speed. Here, $\omega_1 = -\omega_2$.

The housing and/or rotors of the mixers according to the invention may be provided with basically known cooling and heating devices in order, for example, to enable influencing of the reaction course inside the mixer.

A complete heating or cooling of the rotors is possible, in a preferred construction of the mixer/reactor according to the invention, when the heating/cooling medium is directed through one shaft end, in each case a partial flow of the medium is directed through each tooth of the first gear wheel and from there to the series of interconnected gear wheels and kneading bars, then over the entire rotor length to the last gear wheel and from there in turn to the shaft outlet opposite the inlet, a further partial flow of the heating/cooling medium being conveyed through a longitudinal bore of the shaft so that said shaft too may be heated and/or cooled.

Ports for degassing discharge lines, for feed and discharge lines for the material to be mixed and for the connection of measuring instruments may be provided on the housing.

An outward conveying of material to be mixed which lies close to the wall, and the formation of deposits in evaporation stillheads is avoided in a preferred construction of the invention in that all of the outwardly directed surfaces of the kneading bars and all of the outwardly directed surfaces of the gear wheels, which with at least one edge clean the housing at the periphery, are kinematically cleaned by the shaft of an engaged rotor or by the housing. The product-side angles then arising during cleaning between housing and kneading bar or the tooth of a gear wheel are then obtuse. The material to be mixed lying close to the wall is conveyed inwards towards the rotor axis.

In the present context, by product-side angle $\alpha$ (see also FIG. 12) is meant the angle between mixer surfaces which opens at the edge of a tooth or kneading bar between the surface of the tooth or kneading bar (122) and the surface (121) of the mixer to be cleaned in the direction of movement of the edge.

A construction which is particularly preferred is one in which the distance between inner edges (55, 55' in FIG. 5) of the kneading bars 4, 4', 5, 5' and centre of the associated shaft 2, 2' is smaller than or equal to the pitch circle radius. Given said condition, the end faces of the gear wheels are completely cleaned.

The pitch circle radius $r_{t1}$ of a rotor, which rotates at the angular velocity $\omega_1$ and is meshed with another parallel rotor rotating at the angular velocity $\omega_2$, is $$r_{t1} = \frac{\omega_2}{\omega_2 - \omega_1} a,$$

in which a is the distance between the centres of the rotors (distance between axes) and contrarotation is expressed by opposite signs of the angular velocities.

In a preferred embodiment, all of the gear wheels on a shaft have the same number of teeth. It is also preferred that in any geometrical radial section, the number of kneading bars of a shaft is at least 3, 3 being particularly preferred.

The rotors according to the invention may moreover be expanded or combined in any desired manner with known, possibly self-cleaning mixing and kneading elements, e.g. with screw elements in order to achieve a conveying action.

Furthermore, the kneading bars may be disposed not only paraxially but also along a spiral around the axis of rotation in order to achieve a conveying action along the rotor axis.

There follows a detailed description of the invention by way of examples and with reference to the accompanying drawings, which show:

BRIEF DESCRIPTION OF THE DRAWINGS

FIG. 15. The mixer as depicted in FIG. 2, but with heating/cooling medium lines and connections to an external heat exchanger added.

In FIG. 15

151, 151' denotes inlet lines at the shaft end, 152, 153 denotes lines through a tooth of the first gear wheel, 154 denotes a line through the kneading bar, 155 denotes a line through the tooth of the following gear wheel, 156 denotes the line through the next kneading bar, 157 denotes the line through a longitudinal bar of the shaft, 158 denotes the outlet line and the end of the shaft and 159 denotes an external heat exchanger.

Note: In FIGS. 4–11, the points referred to are marked not by reference lines but by circles.

EXAMPLES

Example 1

Figure 1A:
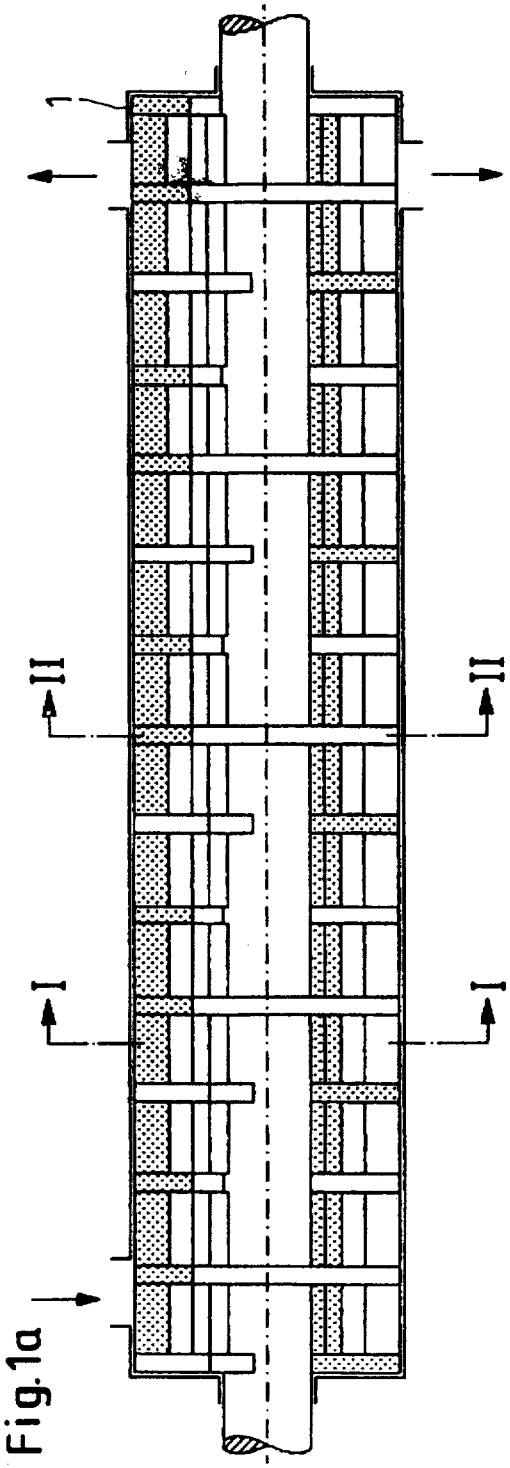
FIGS. 1a and 1b the basic construction of a mixer 6 according to the invention in plan view (FIG. 1b) and in side view (FIG. 1a), (the housing in each case being indicated only as a section)
Figure 1B:
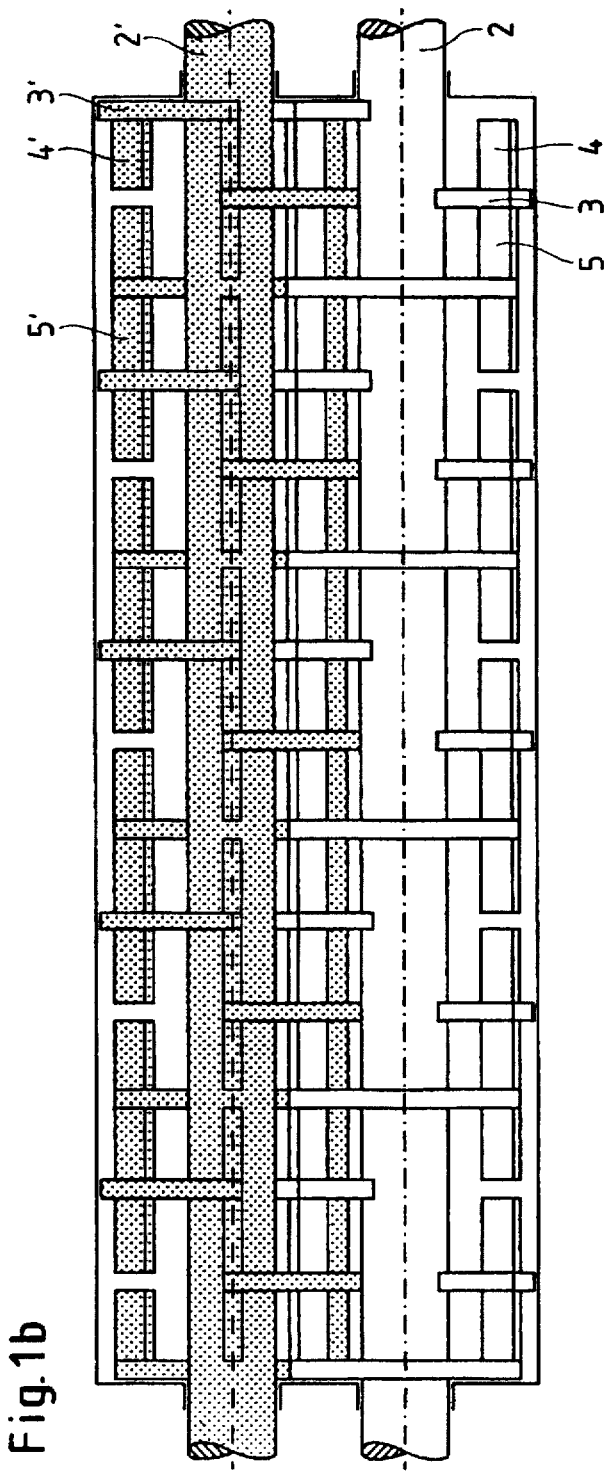

FIGS. 1a and 1b shows the basic construction of a mixer according to the invention. What is shown is a twin-shaft mixer 6, which on each shaft 2, 2' comprises axially spaced-apart, intermeshing groups of gear wheels 3, 3'. Said gear wheels 3, 3' are connected to one another by kneading bars 5, 5'. Further kneading bars 4, 4', which are connected in each case only to one gear wheel, are likewise disposed on the end faces of the gear wheels.

The mixer further comprises an inlet and an outlet for the material to be mixed, as well as a vapour port.

Figure 2:
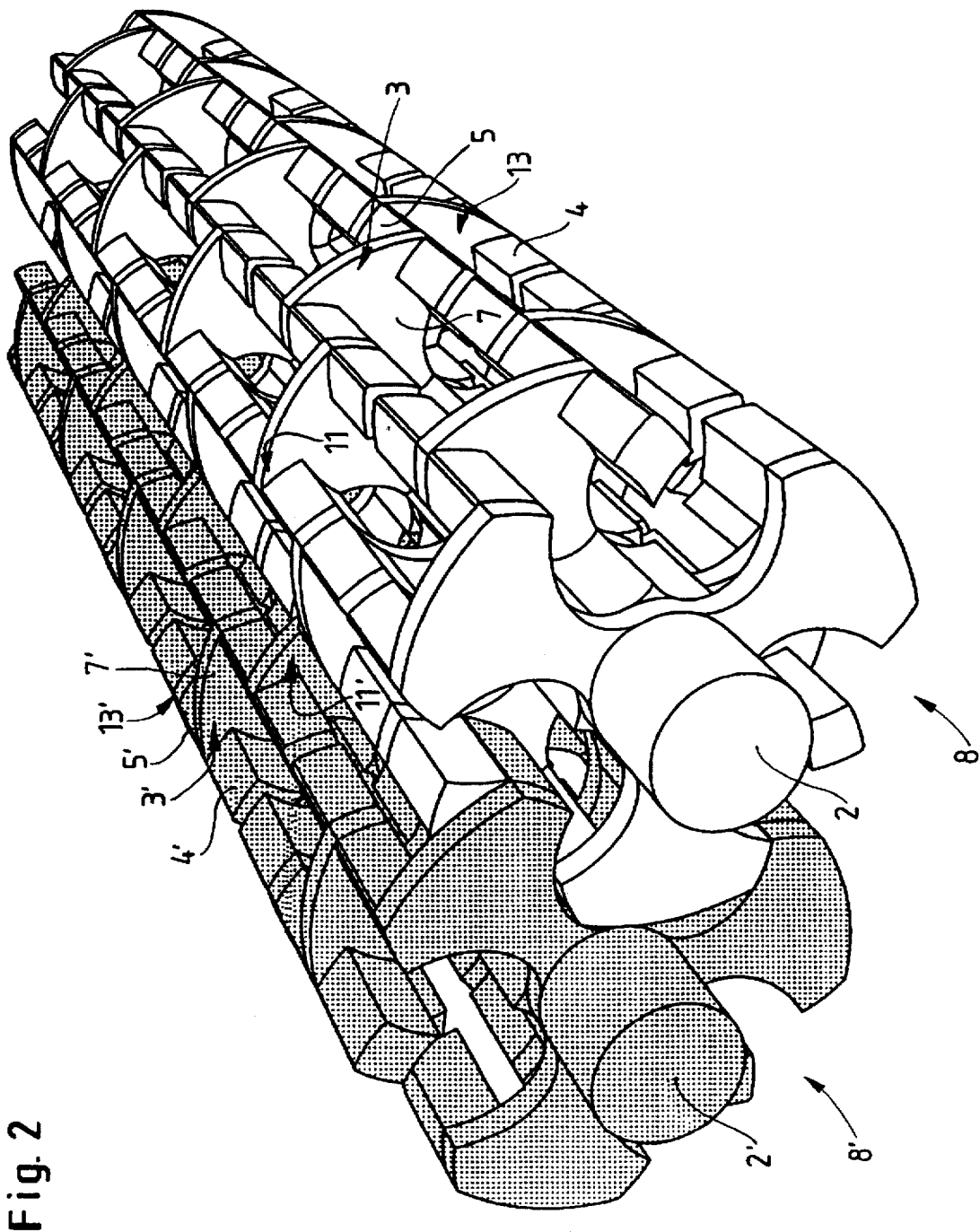
FIG. 2 the view of an embodiment of the mixer 6 according to the invention, (the housing not being shown)

FIG. 2 is a three-dimensional view of the rotors 8, 8' of an embodiment of the mixer 6 according to the invention. The surrounding housing has been omitted from the drawing. The mixer comprises two shafts 2, 2'. Fastened on said shafts are gear wheels 3, 3' each having three teeth 7, 7'. Each tooth of a gear wheel 3, 3' is connected (apart from at the two rotor ends) to one tooth of a gear wheel lying axially in front and one tooth of a gear wheel lying axially behind the first gear wheel by a kneading bar 5, 5'. A further kneading bar 4, 4' is fastened to each tooth face. The kneading bars 4, 4' and 5, 5' are of an identical construction in cross section.

The available useful capacity of said variant according to the invention is 67.8% of the internal volume of the housing.

Figure 4:
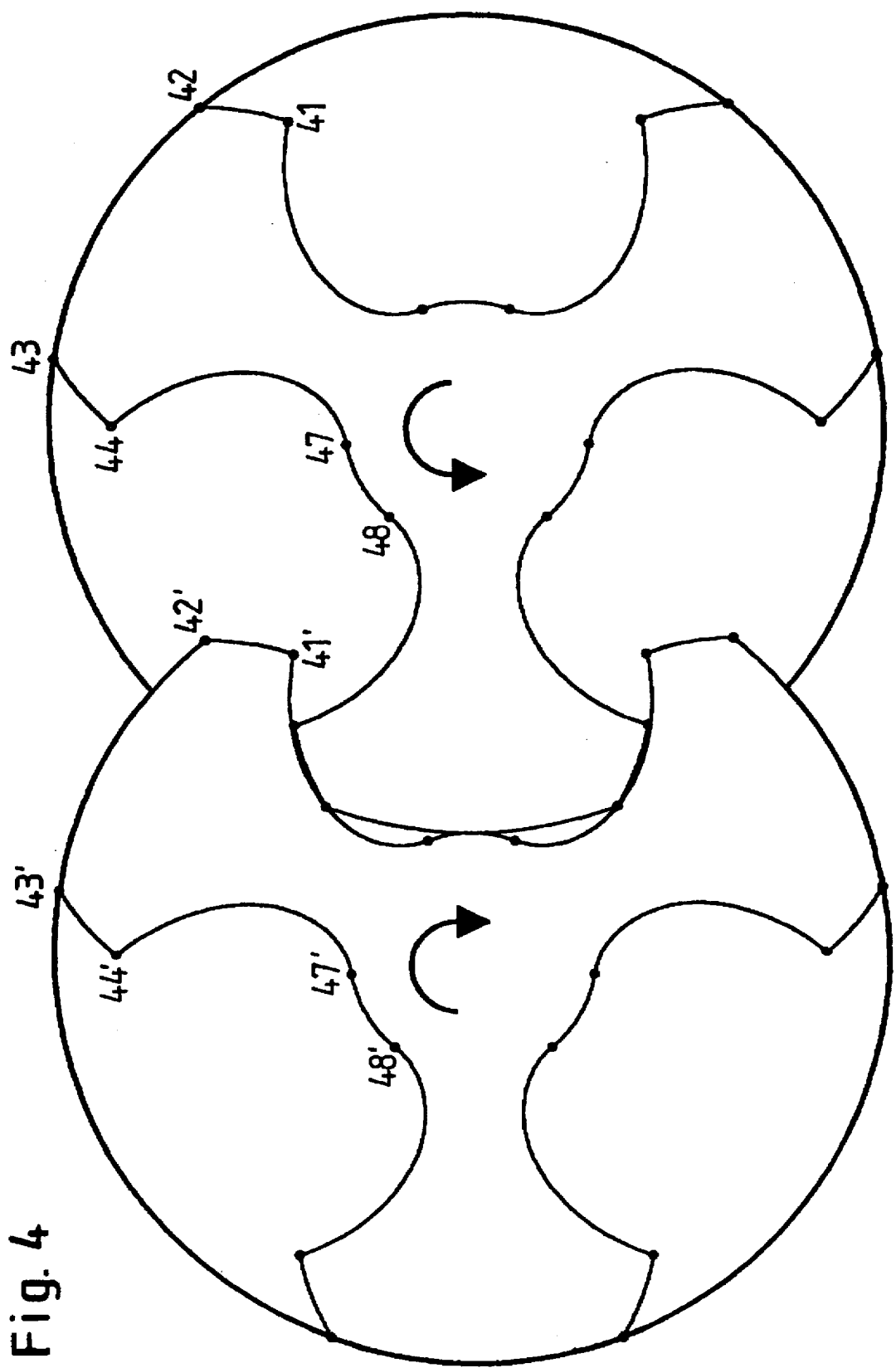
FIG. 4 a radial section (comparable to the line II—II in FIG. 1a) through a gear wheel pair 3, 3' of a mixer 6 according to FIG. 2.

FIG. 4 shows a radial section (according to line II—II in FIG. 1a) through a gear wheel pair 3, 3' of a mixer 6 according to FIG. 2. Cleaning of the surfaces 41–42 is effected by the edges 41', of the surfaces 42–43 by the housing, of the surfaces 43–44 by the edges 44', of the surfaces 44–47 by the edges 43', of the surfaces 47–48 by the surfaces 42'–43' and of the surfaces 48–41 by the edges 42'.

Figure 5:
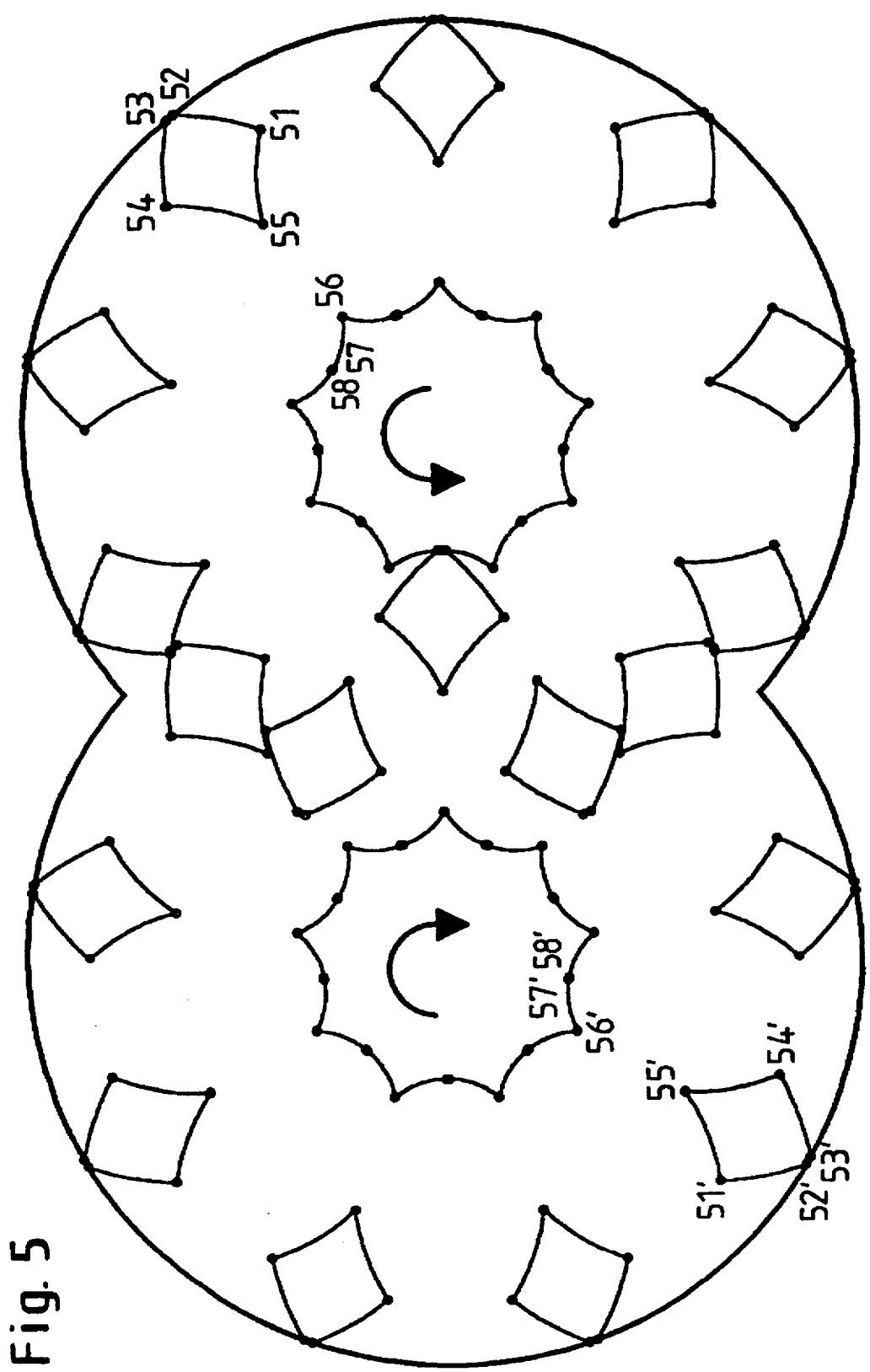
FIG. 5 a radial section (comparable to the line I—I in FIG. 1a) through the kneading bars 4, 4', 5, 5' of a mixer 6 according to FIG. 2.

FIG. 5 shows a radial section (according to line I—I in FIG. 1a) through the kneading bars 4, 4', 5, 5' of a mixer 6 according to FIG. 2. As is evident, cleaning of the surfaces 51–52 is effected by the edges 51', of the surfaces 52–53 by the housing, of the surfaces 53–54 by the edges 54', of the surfaces 54–55 and 56–57 by the edges 53', of the surfaces 57–58 by the surfaces 52'–53' and of the surfaces 58–56 and 55–51 by the edges 52'.

Figure 8:
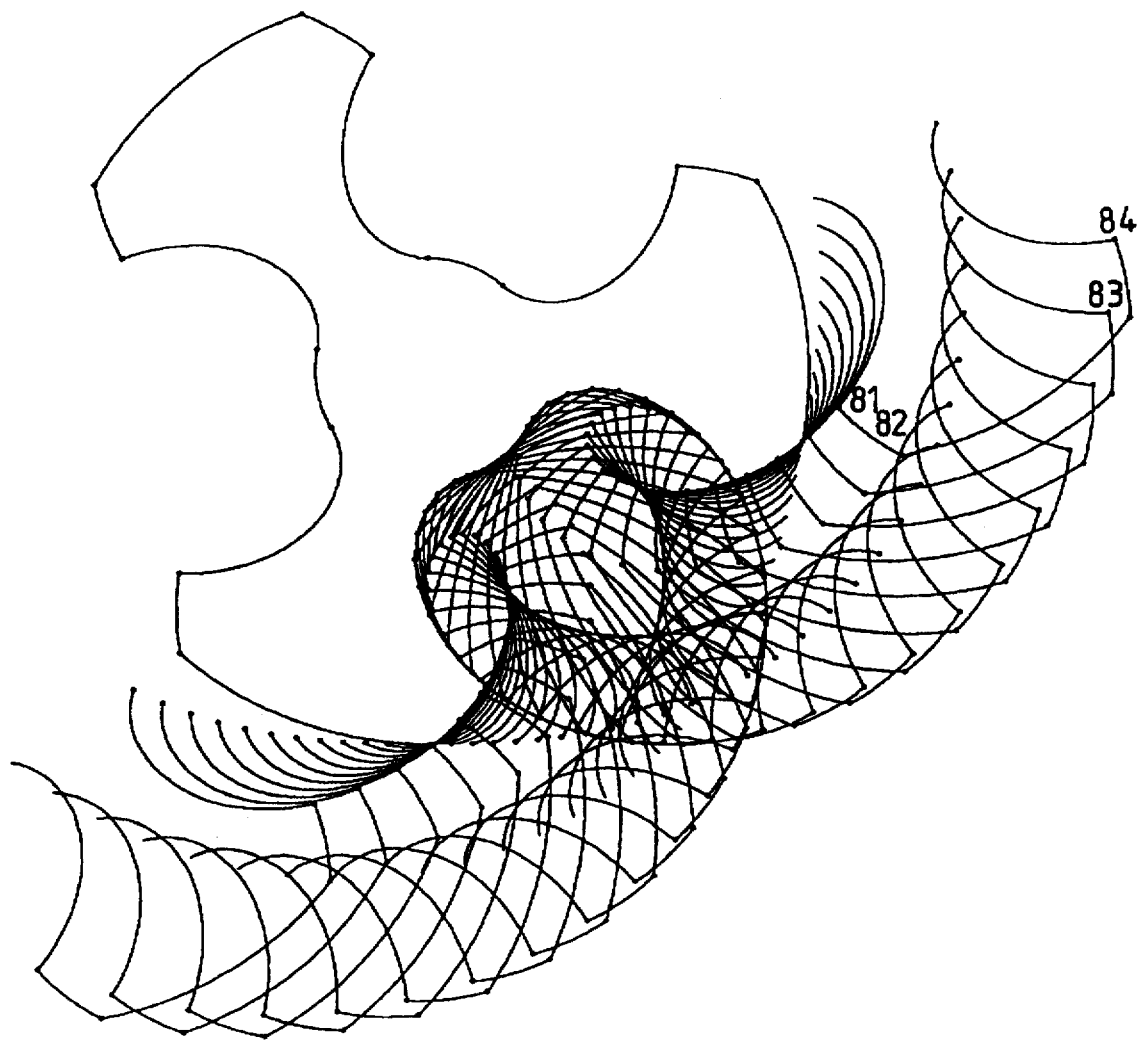
FIG. 8 a radial section (comparable to the line II—II in FIG. 1a) illustrating by means of one-shot displays the relative movement of a tooth 7 of a gear wheel 3 of the mixer 6 according to FIG. 2 relative to the adjacent rotor 8'.

FIG. 8 shows a radial section (according to line II—II in FIG. 1a) illustrating by means of one-shot displays the relative movement of a tooth 81–82–83–84 of a gear wheel 3 of the mixer 6 according to FIG. 2 relative to the other rotor 8' in the course of half a revolution.

Figure 9:
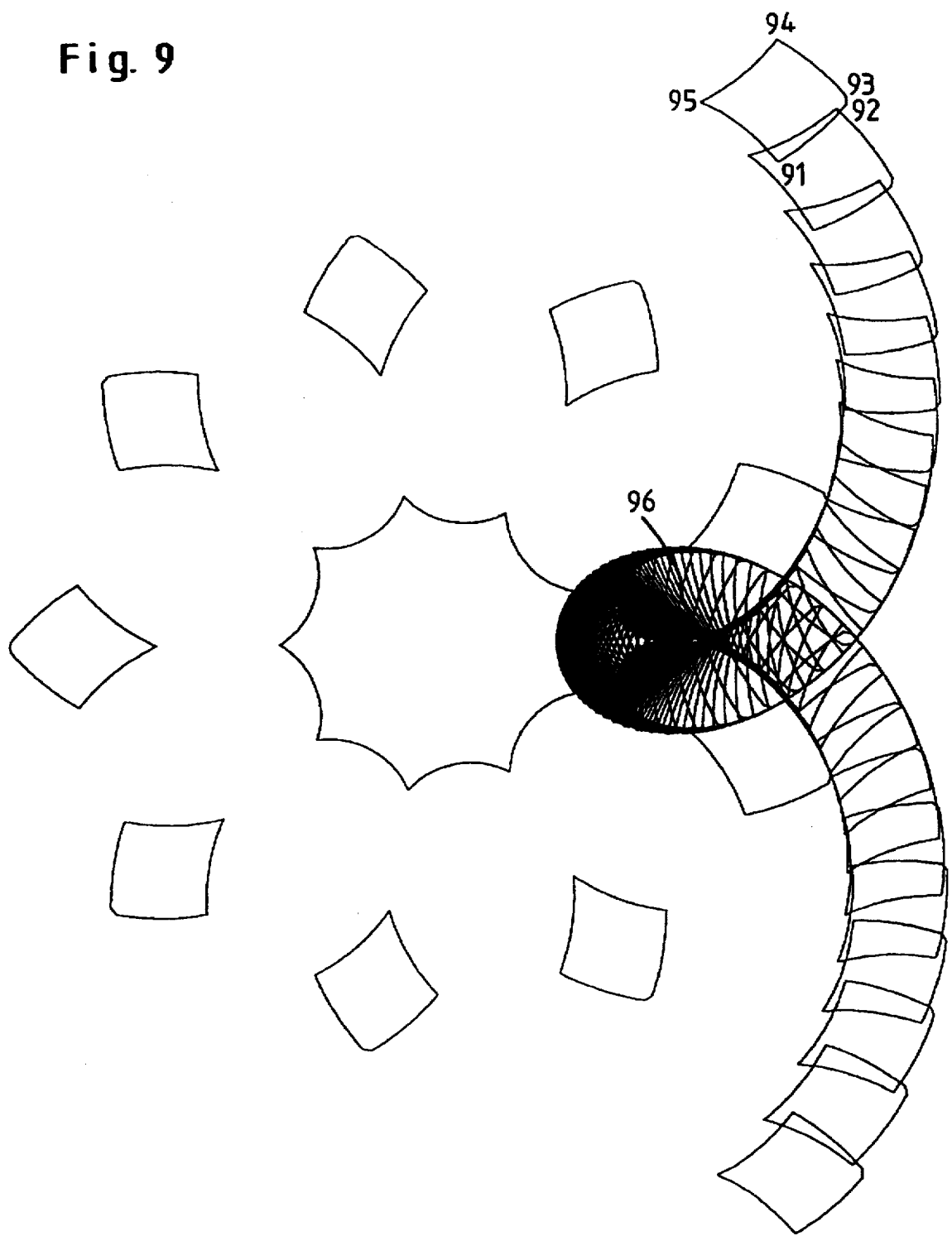
FIG. 9 a radial section (comparable to the line I—I in FIG. 1a) illustrating by means of one-shot displays the relative movement of a kneading bar 4 of the mixer 6 according to FIG. 2 relative to the other rotor 8'.

FIG. 9 shows a radial section (according to line I—I in FIG. 1a) illustrating by means of one-shot displays the relative movement of a kneading bar 91–92–93–94–95 of the mixer 6 according to FIG. 2 relative to the other rotor 8'.

Example 2

Figure 3:
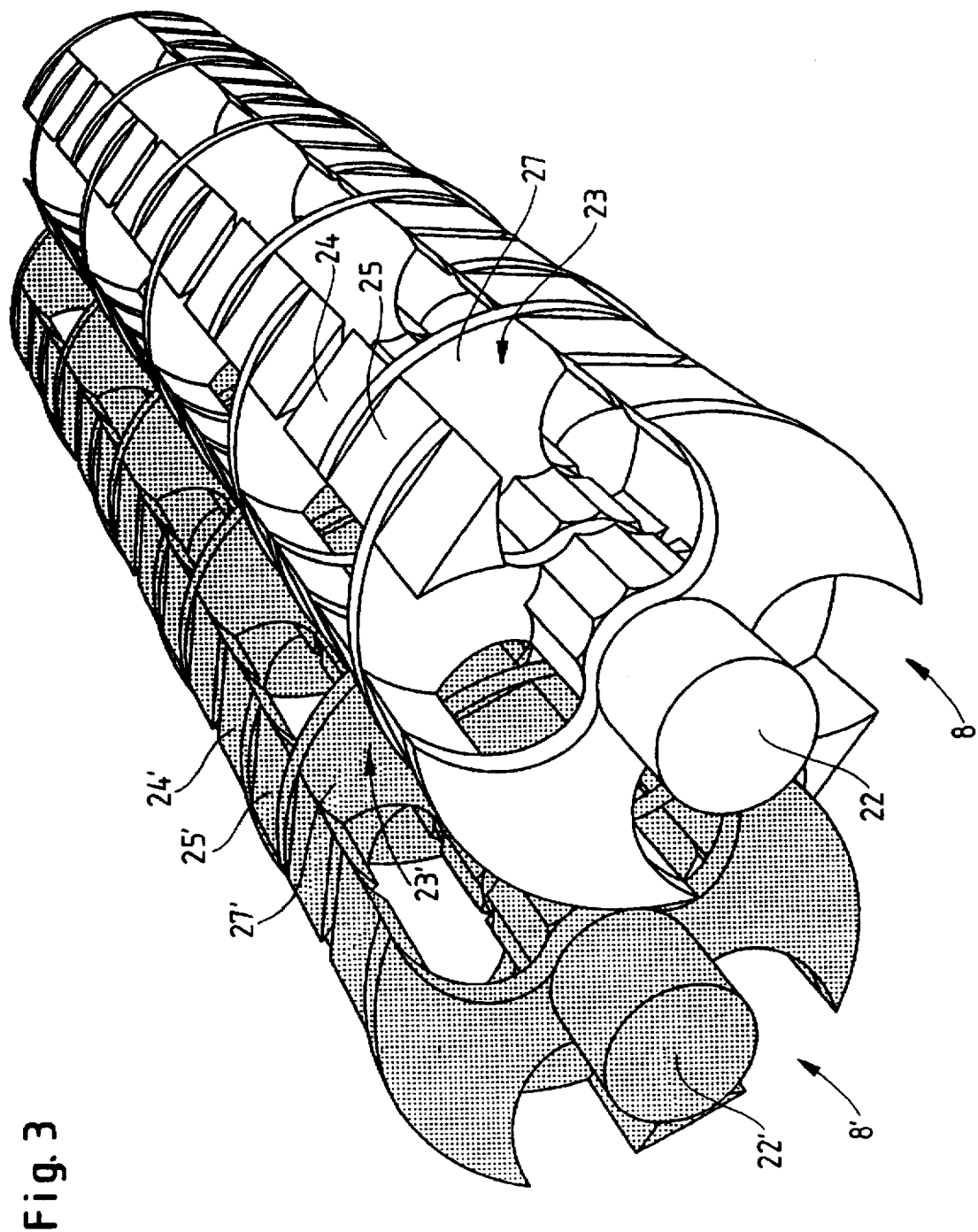
FIG. 3 the view of a further embodiment of the mixer 6 according to the invention, in which the kneading bars 24, 24', 25, 25' and gear wheels 23, 23' are so fashioned that an outward conveying of material to be mixed lying close to the wall does not occur (the housing not being shown)

FIG. 3 shows the three-dimensional view of the rotors 8, 8' of a preferred mixer 6 according to the invention. The housing 1 has been omitted from the drawing. The mixer comprises two shafts 22, 22'. Fastened on said shafts are gear wheels 23, 23' each having two teeth 27, 27'. Each tooth 27 of a gear wheel 23 is connected to one tooth of a gear wheel lying axially in front and one tooth of a gear wheel lying axially behind the first gear wheel by a kneading bar 25, 25'. A further kneading bar 24 is fastened to each tooth face. The kneading bars 24, 24' and 25, 25' are of an identical construction in cross section.

Figure 6:
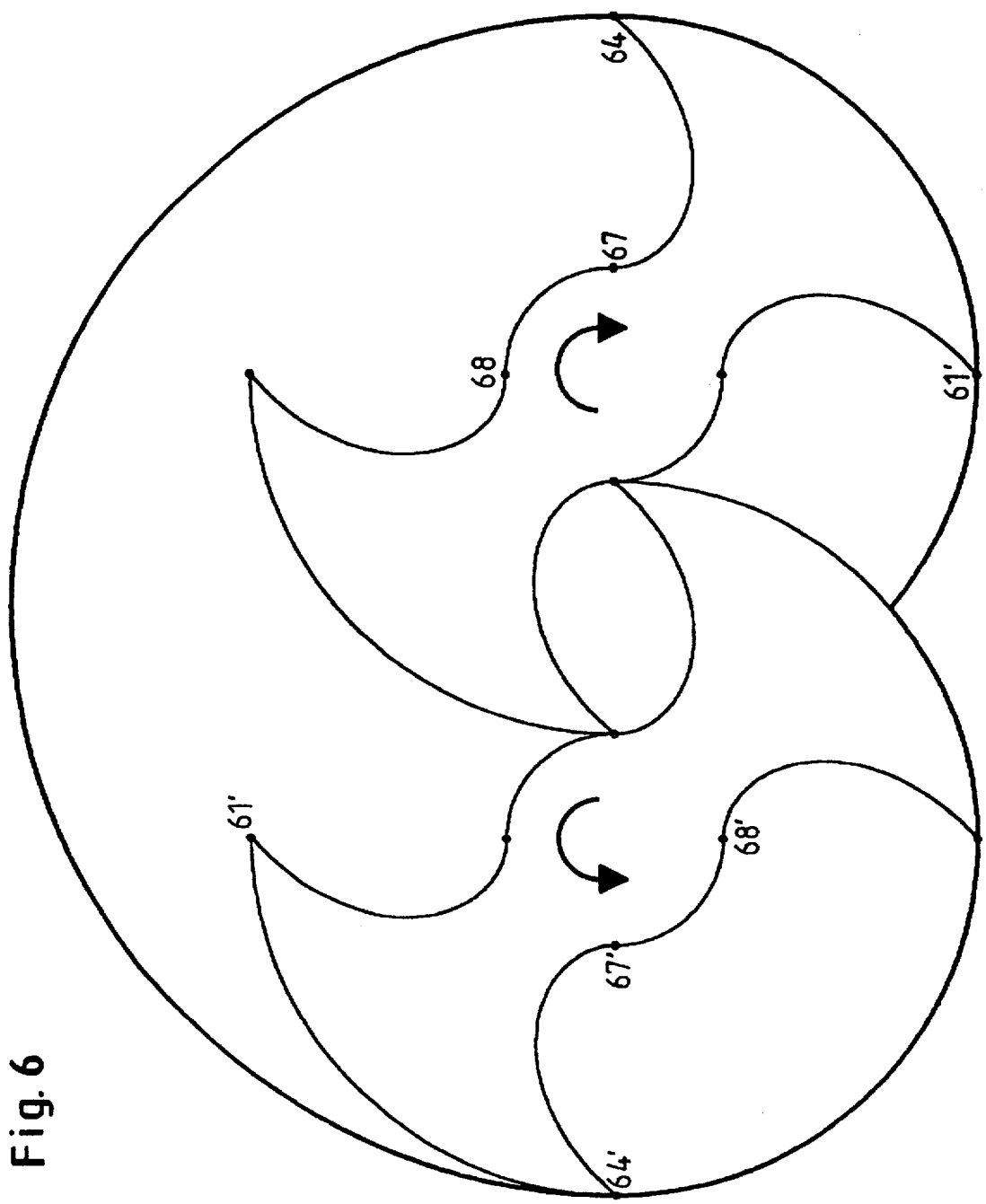
FIG. 6 a radial section (comparable to the line II—II in FIG. 1a) through a gear wheel pair 23, 23' of a mixer 6 according to FIG. 3.

FIG. 6 shows a radial section (comparable to the line II—II in FIG. 1a) through a gear wheel pair 23, 23' of a mixer 6 according to FIG. 3. Cleaning of the surfaces 61–64 is effected by the housing, of the surfaces 64–67 by the edges 64', of the surfaces 67–68 by the surfaces 61'–64' and of the surfaces 68–61 by the edges 61'.

Figure 7:
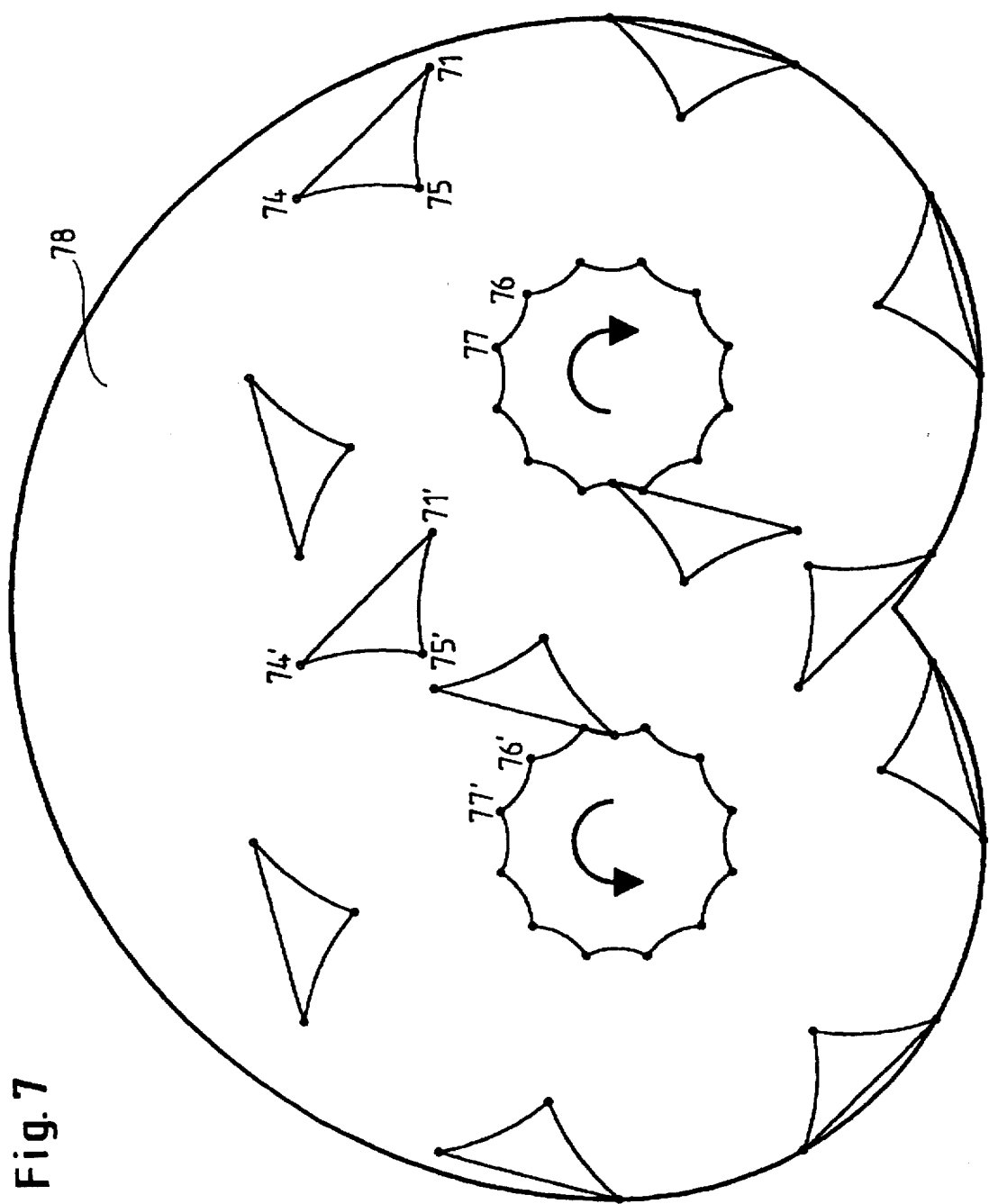
FIG. 7 a radial section (comparable to the line I—I in FIG. 1a) through the kneading bars 24, 24', 25, 25' of a mixer 6 according to FIG. 3, here in the region of an evaporation stillhead.

FIG. 7 shows a radial section (comparable to the line I—I in FIG. 1a) through the kneading bars 24, 24', 25, 25' of a mixer 6 according to FIG. 3. Cleaning of the surfaces 71–74 of the kneading bars is effected by the shaft at 77', of the surfaces 74–75 by the edges 74', of the surfaces 76–77 by the edges 71' and 74' and of the surfaces 75–71 by the edges 71'. The housing 1 here comprises in particular one evaporation stillhead 78.

Figure 10:
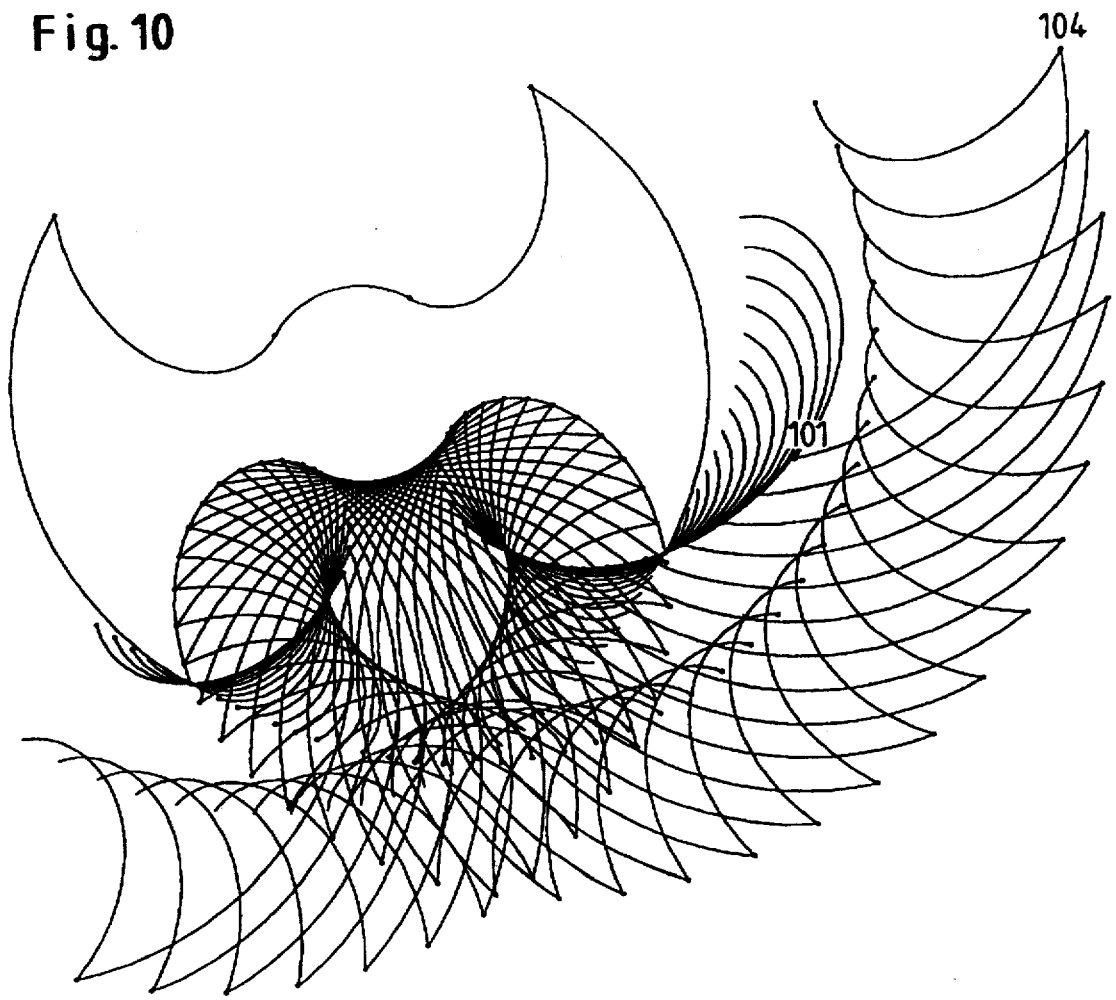
FIG. 10 a radial section (comparable to the line II—II in FIG. 1a) illustrating by means of one-shot displays the relative movement of a tooth 27 of a gear wheel 23 of the mixer 6 according to FIG. 3 relative to the adjacent rotor 8'.

FIG. 10 shows a radial section (comparable to the line II—II in FIG. 1a) illustrating by means of one-shot displays the relative movement of a tooth 101–104 of a gear wheel of the mixer 6 according to FIG. 3 relative to the other rotor in the course of half a revolution.

Figure 11:
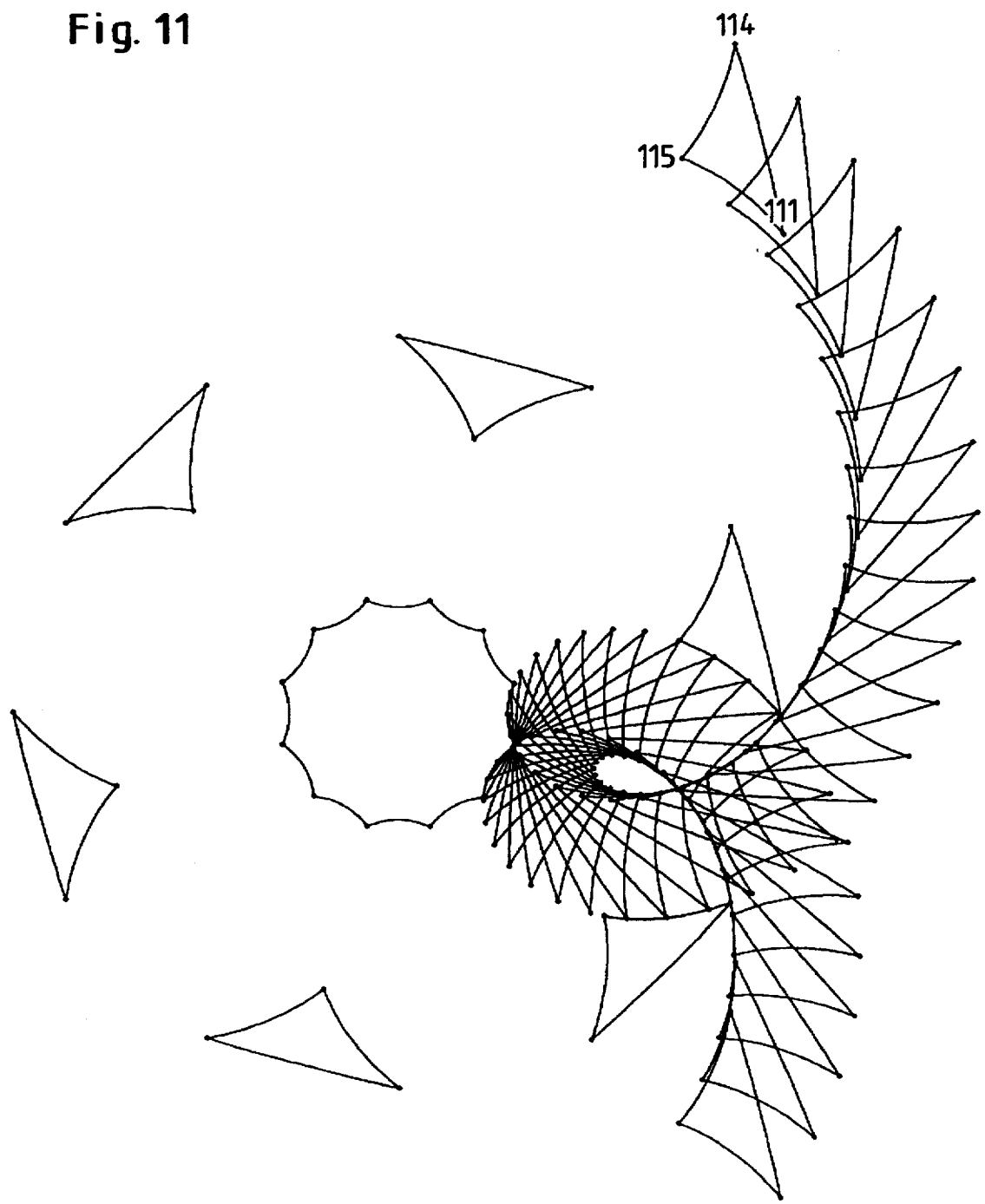
FIG. 11 a radial section (comparable to the line I—I in FIG. 1a) illustrating by means of one-shot displays the relative movement of a kneading bar 24 of the mixer 6 according to FIG. 3 relative to the kneading bars of the other shaft.
Figure 12:
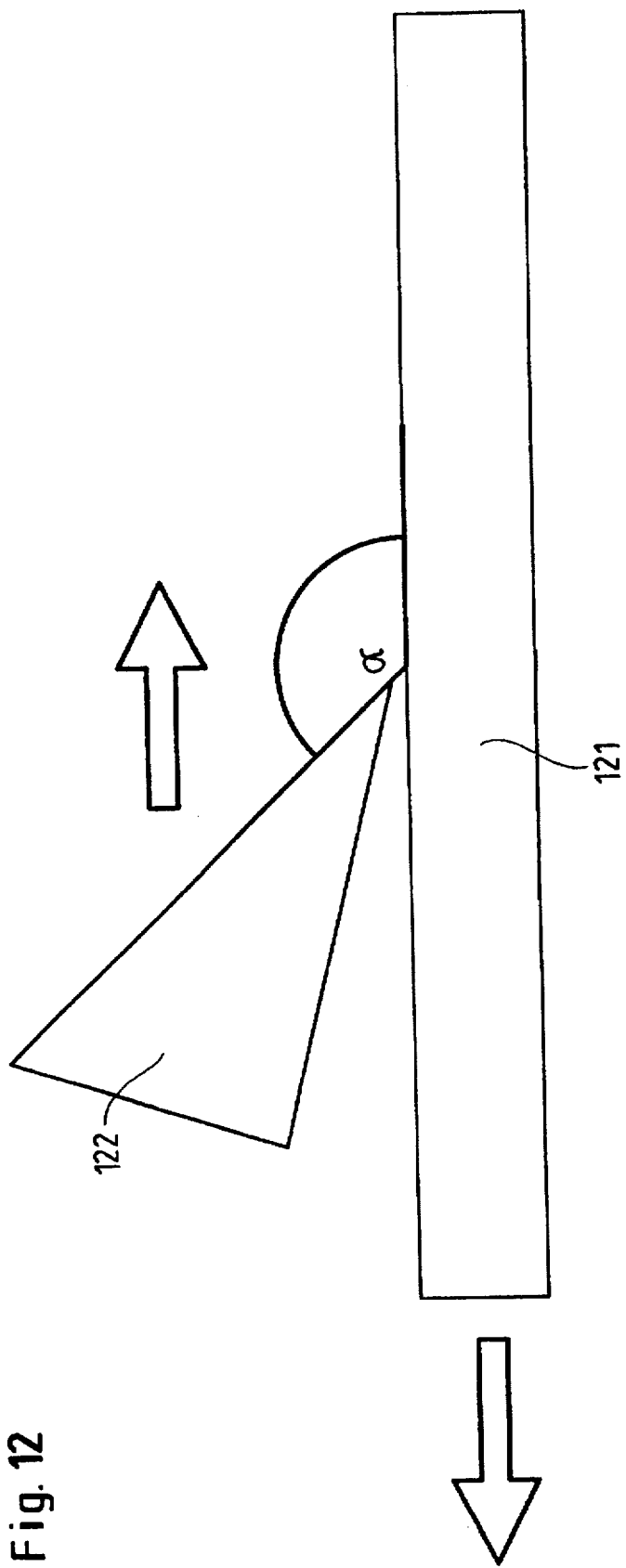
FIG. 12 a diagram to explain the term "product-side angle"

FIG. 11 shows a radial section (comparable to the line I—I in FIG. 1a) illustrating by means of one-shot displays the relative movement of a kneading bar 111–114–115 of the mixer according to FIG. 3 relative to the other rotor.

By virtue of the fact that cleaning of the outwardly directed surfaces of the gear wheels 61–64 is effected by the housing and of the outwardly directed surfaces of the kneading bars 71–74 by the shafts 76'–77', at the wall no material to be mixed may be conveyed outwards. As a result, material to be mixed or product is prevented from being displaced into possibly provided vacuum stillheads or ports for measuring instruments. The construction is therefore suitable for use with an evaporation stillhead extending over the entire reactor length, as is indicated by way of example in the form of a housing contour in FIG. 7.

Example 3

Figure 13:
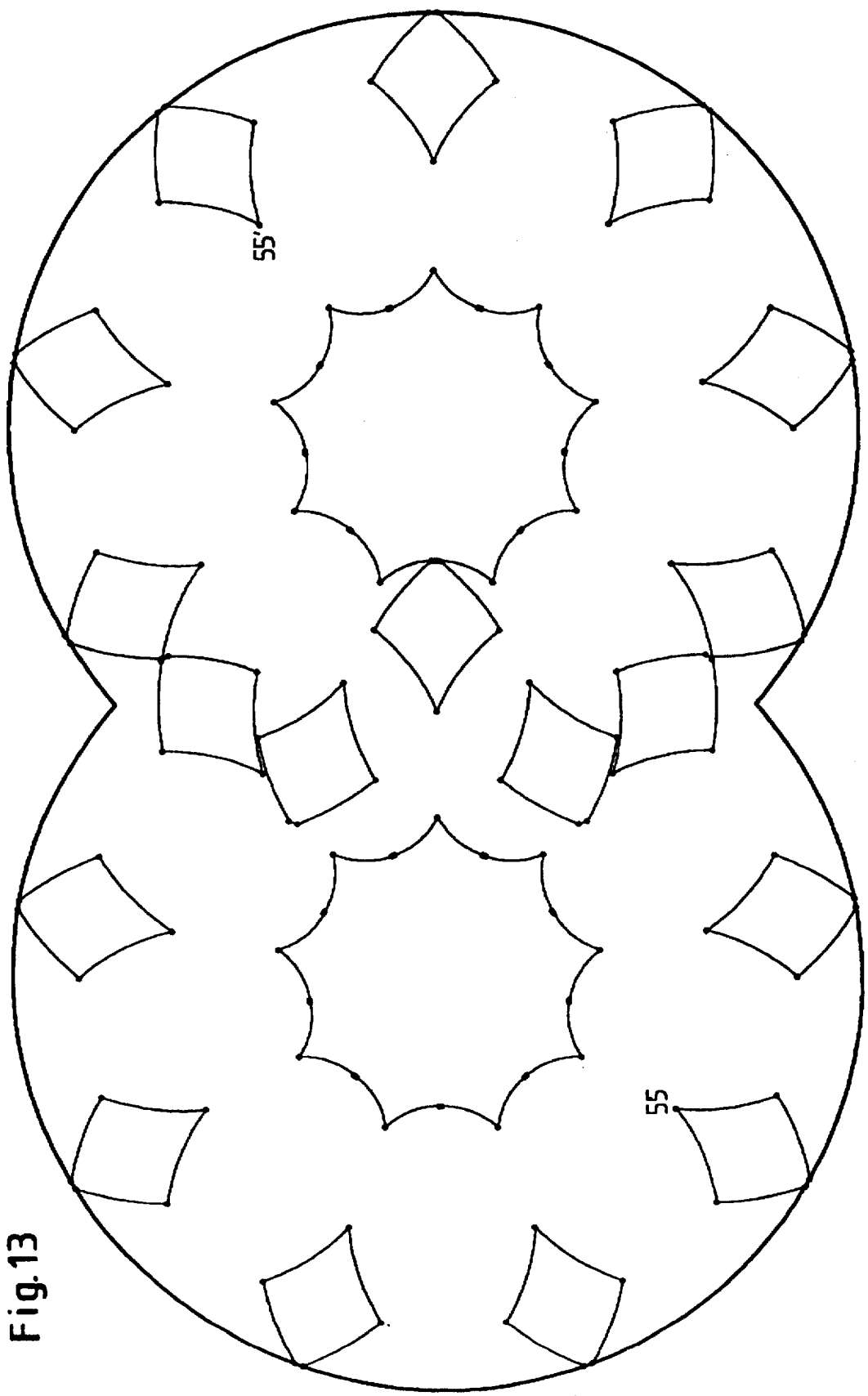
FIG. 13 a radial section (comparable to the line I—I in FIG. 1a) through the kneading bars 4, 4', 5, 5' of a mixer 6 according to FIG. 2.

FIG. 13 shows a radial section (comparable to the line I—I in FIG. 1a) through the kneading bars 4, 4', 5, 5' of a mixer 6 according to FIG. 2.

Whereas in Example 1 the ratio between diameter of the rotors 8, 8' and the distance between the centres of the shafts 2, 2' was $$\frac{D}{a} = 1.5416,$$

in Example 3 it is $$\frac{D}{a} = 1.525.$$

As a result, the inner edge (55, 55' in FIG. 5 or 13) of the kneading bars 4, 4', 5, 5' moves closer to the shaft.

Whereas in Example 2 the ratio of the distance between inner edge 55, 55' of the kneading bars 4, 4', 5, 5' and centre of the shaft 2, 2' and the distance between the centres of the shafts 2, 2' was $$\frac{r}{a} = 0.5055,$$

in the present example, the ratio of the distance between inner edge 55, 55' of the kneading bars 4, 4', 5, 5' and centre of the shafts 2, 2' and the distance between the centres of the shafts 2, 2' is $$\frac{r}{a} = 0.4889.$$

In said case, the pitch circle radius is equal to half the distance between the centres of the shafts 2, 2', since the shafts are rotating at the same speed so that, in Example 1, the distance between inner edge 55, 55' of the kneading bar 4, 4', 5, 5' and centre of the shaft 2, 2' is greater and, in the present example, is smaller than the pitch circle radius.

Figure 14:
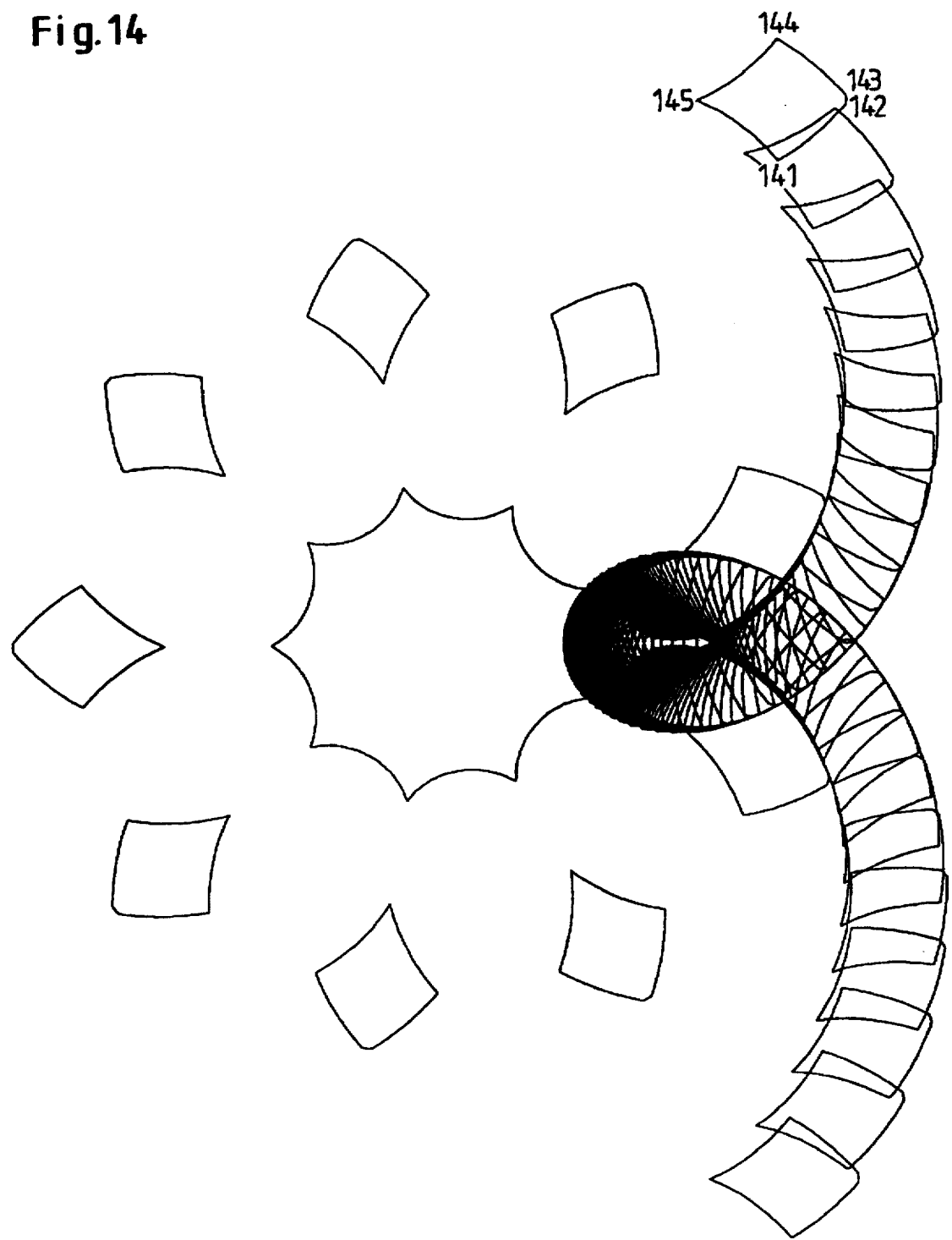
FIG. 14 a radial section (comparable to the line I—I in FIG. 1a) illustrating by means of one-shot displays the relative movement of a kneading bar 4 of the mixer 6 according to FIG. 2 relative to the other rotor 8'.

FIG. 14 shows a radial section (according to the line I—I in FIG. 1a) illustrating by means of one-shot displays the relative movement of a kneading bar of the mixer 6 according to FIG. 2 relative to the other rotor 8'.

It is evident from a comparison between FIGS. 9 and 14 that in FIG. 9, inside the loop-like figure described by the kneading bar 91, 92, 93, 94, 95, a very small surface 96 remains which is not swept over. This corresponds to an uncleaned surface on the end faces of the gear wheels 3, 3'. In contrast, no unswept area remains inside the loop-like figure described by the kneading bar 141, 142, 143, 144, 145 in FIG. 14. This corresponds to a complete cleaning of the end faces of the gear wheels.

The invention claimed is:

1. A mixer/reactor comprising:
   a surrounding housing;
   two or more parallel axially directed counter-rotating shafts disposed in said housing, each of said shafts having respective groups of intermeshing gear wheels mounted thereon, which gear wheels are disposed in an axially offset manner, each of said gear wheels having a plurality of circumferentially spaced apart radially extending teeth, each of said teeth being connected by a kneading bar to the immediately adjacent gear wheels and each of said teeth having at least one further kneading bar disposed on each end face thereof, with the exception of the end faces of the gear wheels facing the housing end faces, said further kneading bars not being connected to any other gear wheel, the edges of cut of the gear wheels and kneading bars which arise in any radial section all being geometrically either arcs of a circle around the center of rotation or epicycloidal sections,
   the edges of cut of the gear wheels and kneading bars which arise in any radial section all being geometrically concave when they point inwards,
   the edges of cut of the gear wheels and kneading bars which clean the housing at least with one edge at the periphery being convex when they point outwards, except for the edges of cut of surfaces which are cleaned by another shaft,
   whereby the end faces of each gear wheel, apart from those which are cleaned by the housing end faces, are kinematically cleaned by the kneading bars of a respective other adjacent shaft, and the remaining surfaces of the gear wheels are completely kinematically cleaned either by the housing or by the intermeshing gear wheel of an adjacent shaft, the unconnected end faces of said further kneading bars are cleaned by the gear wheels on an adjacent shaft, the remaining surfaces of said kneading bars and said further kneading bars of each of said shafts are completely kinematically cleaned either by said housing or by an adjacent shaft or by the kneading bars of an adjacent shaft.

2. Mixer/reactor (6) according to claim 1, characterized in that all of the gear wheels on a shaft have the same number n of teeth and that in any geometrical radial section the number of kneading bars on a shaft is at least 3 times n.

3. Mixer/reactor (6) according to claim 2, characterized in that in any radial section the number of kneading bars of a shaft (2) or (2') is exactly 3 times n.

4. Mixer/reactor (6) according to claim 1, characterized in that all of the outwardly directed surfaces of gear wheels (3, 3') or (13, 13') and kneading bars (4, 4') or (5, 5') which clean the housing (1) at its periphery, are themselves cleaned by the housing (1) or by a shaft (2') or (2).

5. Mixer/reactor (6) according to claim 1, characterized in that all of the shafts (2, 2') are rotatable at the same speed as each other.

6. Mixer/reactor (6) according to claim 1, characterized in that the housing (1), the rotors (8, 8') or both are provided with a heating/cooling device.

7. Mixer/reactor (6) according to claim 6, characterized in that a heating or cooling medium is directed in suitable lines through one end of each shaft, in each case a partial flow of the medium is directed through each tooth (7, 7') of the gear wheel (3, 3') closest to said end, and from there to the other gear wheels (3, 3', 13, 13' etc.) and to the kneading bars (5, 5'), then over the entire length of the shaft to the last gear wheel and from there in turn to a shaft outlet opposite the inlet, with a further partial flow of the heating or cooling medium being conveyed through a longitudinal bore of each of the shafts (2, 2') in order to heat or cool said shafts also.

8. Mixer/reactor (6) according to claim 1, in which the distance between the inner edges (55, 55') of the kneading bars and the centre of the associated shaft (2, 2') is smaller than or equal to the pitch circle radius.

* * * * *